ус010706172B2

(12) United States Patent
Wang et al.

(10) Patent No.: US 10,706,172 B2
(45) Date of Patent: Jul. 7, 2020

(54) CONTROLLED DEVICE, SECURITY MANAGEMENT METHOD, AND SECURITY MANAGEMENT SYSTEM

(71) Applicant: INSYDE SOFTWARE CORP., Taipei (TW)

(72) Inventors: Chih-Kao Wang, Taipei (TW); Chia-Ting Yu, Taipei (TW); I-Te Chen, Taipei (TW); Ling-Wen Chuang, Taipei (TW)

(73) Assignee: INSYDE SOFTWARE CORP., Taipei (TW)

( * ) Notice: Subject to any disclaimer, the term of this patent is extended or adjusted under 35 U.S.C. 154(b) by 203 days.

(21) Appl. No.: 15/983,845

(22) Filed: May 18, 2018

(65) Prior Publication Data

US 2018/0341781 A1 Nov. 29, 2018

(30) Foreign Application Priority Data

May 24, 2017 (TW) .............................. 106117137 A
Nov. 6, 2017 (TW) .............................. 106138256 A

(51) Int. Cl.
*G06F 21/62* (2013.01)
*H04W 12/08* (2009.01)
*G06F 21/35* (2013.01)
*H04W 12/00* (2009.01)

(52) U.S. Cl.
CPC .......... *G06F 21/6245* (2013.01); *G06F 21/35* (2013.01); *H04W 12/003* (2019.01); *H04W 12/00503* (2019.01); *H04W 12/08* (2013.01)

(58) Field of Classification Search
CPC .. G06F 21/62; G06F 21/35; H04W 12/00503; H04W 4/02; H04W 12/08; H04W 12/06
See application file for complete search history.

(56) References Cited

U.S. PATENT DOCUMENTS

| 5,796,338 A * | 8/1998 | Mardirossian ..... G08B 13/1427 340/539.1 |
| 2013/0097080 A1* | 4/2013 | Smets ...................... G06T 1/20 705/44 |
| 2017/0359723 A1* | 12/2017 | Pal ...................... H04L 63/0853 |

* cited by examiner

*Primary Examiner* — Paul E Callahan
(74) *Attorney, Agent, or Firm* — Rabin & Berdo, P.C.

(57) ABSTRACT

A security management system includes a controlled device to execute a security management method. The controlled device includes a wireless module and a processing module. The processing module communicates with a main controlling device through the wireless module for pairing. When the main controlling device is successfully paired to the controlled device, the processing module executes a security mode. In the security mode, a user directly operates the controlled device. When the controlled device is not successfully paired to the main controlling device, the controlled device cannot execute the security mode, and the controlled device cannot be operated. Therefore, the user only needs to ensure that the main controlling device is nearby; even if the user is at a position distanced from the controlled device, the controlled device may not be operated by others.

14 Claims, 8 Drawing Sheets

CONTROLLED DEVICE, SECURITY MANAGEMENT METHOD, AND SECURITY MANAGEMENT SYSTEM

CROSS-REFERENCE TO RELATED APPLICATIONS

This application claims the priority benefit of TW application serial No. 106117137, filed on May 24, 2017, and the priority benefit of TW application serial No. 106138256, filed on Nov. 6, 2017. The entirety of the above-mentioned patent applications is hereby incorporated by reference herein and made a part of the specification.

BACKGROUND OF THE INVENTION

1. Field of the Invention

The present invention relates to a management method and a management system, and more particularly to a controlled device, a security management method, and a security management system.

2. Description of the Related Art

Computers are currently one of the most commonly used electronic devices. For users, the computers often store a great amount of personal information, such as user accounts, passwords and even a scanned file of an ID card of the user, or other personal privacy-sensitive information.

Therefore, the user usually locks access to the computer by account information and a password. When the user needs to use the computer, the user must firstly enter the account information and the password to log in an operating system of the computer. Then the user may operate the computer normally. In this way, the personal privacy-sensitive information of the user may be prevented from being accessed by unauthorized persons.

However, the user must firstly enter the account information and the password to unlock the computer so as to operate the computer. It is inconvenient for the user to take any further action before the user operates the computer.

Furthermore, when the user needs to enter the account information and the password, if other people are beside the user, it is easy for others to peek and obtain the account information and the password. If the user of the computer directly asks other people to divert their attention to elsewhere, that easily leads to an embarrassing situation. Therefore, the technique of preventing the personal privacy-sensitive information from being accessed needs to be further improved.

SUMMARY OF THE INVENTION

An objective of the present invention is to provide a controlled device, a security management method, and a security management system. The present invention may be conveniently operated by a user, and the user does not need to ask other people to divert their attention. Therefore, the user may not encounter any embarrassment, and the personal privacy-sensitive information may be prevented from being accessed and stolen.

The controlled device includes a wireless connecting module and a processing module.

The wireless module communicates with a main controlling device.

The processing module is electrically connected to the wireless module, and communicates with the main controlling device through the wireless module for pairing. When the controlled device is successfully paired to the main controlling device, the processing module of the controlled device executes a security mode.

Further, the security management method is executed by the controlled device, and includes steps of:
communicating with a main controlling device for pairing;
determining whether the main controlling device is successfully paired to the controlled device; and
when the main controlling device is successfully paired to the controlled device, executing a security mode.

Moreover, the security management system includes a main controlling device and a controlled device.

The controlled device includes a wireless connecting module and a processing module. The wireless module communicates with a main controlling device.

The processing module is electrically connected to the wireless module, and communicates with the main controlling device through the wireless module for pairing. When the controlled device is successfully paired to the main controlling device, the processing module of the controlled device executes a security mode.

The present invention pairs the controlled device and the main controlling device. When the controlled device is successfully paired to the main controlling device, the processing module of the controlled device executes the security mode. In the security mode, a user of the controlled device may directly operate the controlled device. Namely, the controlled device only can be operated by the user when the controlled device executes the security mode. When the controlled device is not successfully paired to or connected with the main controlling device, the controlled device may not execute the security mode, and the controlled device may not be operated. Therefore, the user only needs to ensure that the main controlling device is nearby, and even if the user is at a position distanced from the controlled device, the controlled device may not be operated by others.

In addition, in the security mode, the controlled device can automatically enter data. When the user needs to enter account information and a password, the controlled device in the security mode will be able to automatically enter the account information and the password. Therefore, the user does not need to invite others to divert their attention, and the data may be automatically entered. Hence, the present invention may provide the user with a convenient and safe way to enter data.

DETAILED DESCRIPTION OF THE INVENTION

Figure 1:
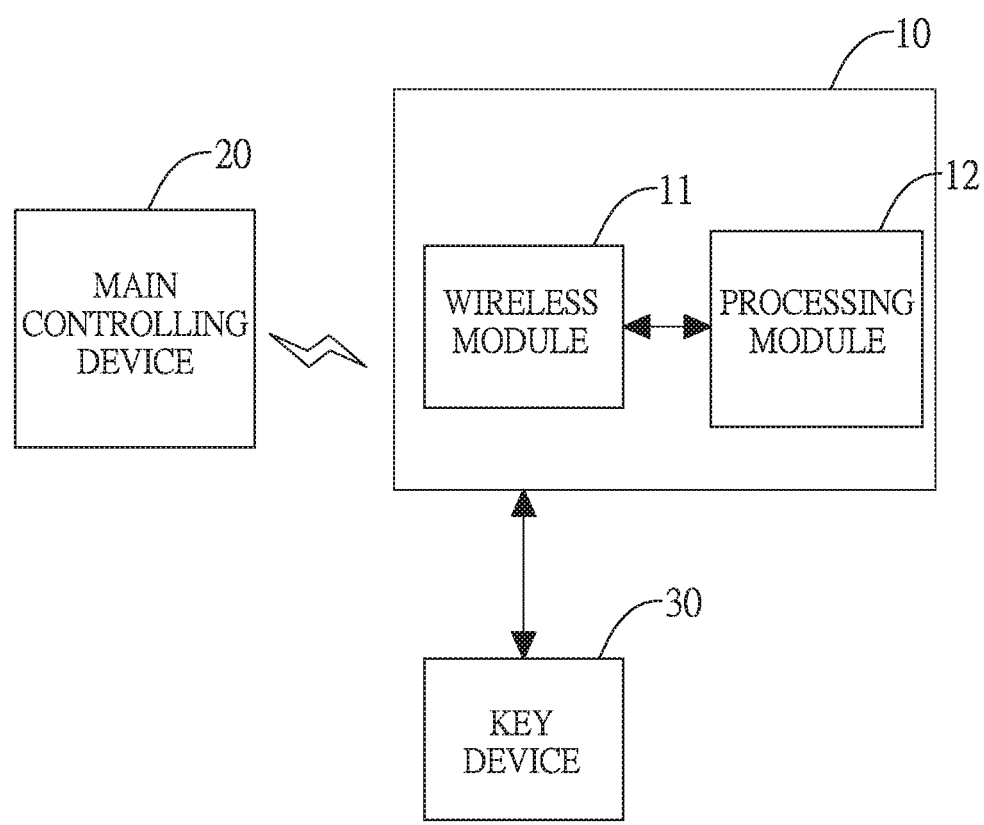
FIG. 1 is a block diagram of a security management system of the present invention.

With reference to FIG. 1, the present invention relates to a controlled device, a security management method, and a security management system. The security management system includes the controlled device 10 and a main controlling device 20. The controlled device 10 communicates with the main controlling device 20 and includes a wireless module 11 and a processing module 12.

The controlled device 10 communicates with the main controlling device 20 through the wireless module 11. The processing module 12 is electrically connected to the wireless module 11 and communicates with the main controlling device 20 through the wireless module 11 for pairing. When the controlled device 10 is successfully paired to the main controlling device 20, the processing module 12 of the controlled device 10 executes a security mode. In an embodiment, when the controlled device 10 is not successfully paired to the main controlling device 20, the controlled device 10 maintains an original state.

For example, the original state of the controlled device 10 may be a locked state to wait for a user of the controlled device 10 to input a password. When the controlled device 10 is not successfully paired to the main controlling device 20, the controlled device 10 maintains the locked state.

Figure 2:
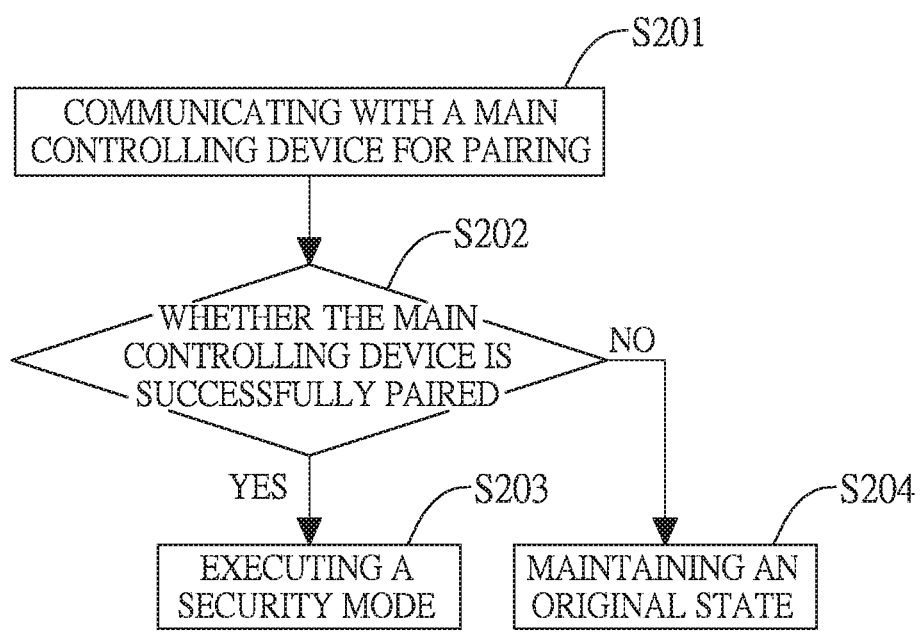
FIG. 2 is a flowchart of a first embodiment of a security management method of the present invention.

Further, with reference to FIG. 2, the security management method is executed by the controlled device 10, and a first embodiment of the security management method includes steps of:

communicating with a main controlling device 20 for pairing (S201);

determining whether the main controlling device 20 is successfully paired to the controlled device 10 (S202);

when the main controlling device 20 is successfully paired to the controlled device 10, executing a security mode (S203);

when the main controlling device 20 is not successfully paired to the controlled device 10, maintaining an original state (S204).

The present invention pairs the controlled device 10 and the main controlling device 20. When the controlled device 10 is successfully paired to the main controlling device 20, the controlled device 10 executes the security mode. In the security mode, a user of the controlled device 10 may directly operate the controlled device 10. When the controlled device 10 is not successfully paired to the main controlling device 20, the controlled device 10 maintains the original state. Therefore, the user only needs to ensure that the main controlling device 20 is nearby, and the user may directly and conveniently operate the controlled device 10 without entering account information or a password.

In addition, when the user needs to enter the account information or the password, if other people are beside the user, it is easy for others to peek and obtain the account information and the password. If the user directly asks other people to divert their attention, that easily leads to an embarrassing situation. Therefore, in the security mode, the controlled device 10 can automatically enter data. The user does not need to invite others to divert their attention, and the data may be automatically entered. Hence, the present invention may provide the user with a convenient and safe way to enter data.

With reference to FIG. 1, when the processing module 12 of the controlled device 10 executes the security mode, the controlled device 10 may automatically login an operation system of the controlled device 10. For example, when the controlled device 10 and the main controlling device 20 are successfully paired, the controlled device 10 may automatically login the operation system of the controlled device 10, and the user may directly operate the controlled device 10. However, when the controlled device 10 and the main controlling device 20 are not successfully paired, the controlled device 10 may not login the operation system of the controlled device 10, and the controlled device 10 maintains the original state. Therefore, personal privacy-sensitive information of the user stored in the controlled device 10 may be protected.

In another embodiment, when the processing module 12 executes the security mode, the processing module 12 allows a predetermined application to be executed, allows a predetermined web browser to browse a predetermined webpage, or allows a predetermined application to open a predetermined data file. For example, the predetermined application may be an email application, the predetermined webpage may be an email login webpage browsed by the predetermined web browser, and the predetermined data file may be a text data file opened by a text editing application. When the controlled device 10 and the main controlling device 20 are successfully paired, the processing module 12 allows the email application to be executed, allows the email login webpage to be browsed by a web browser, or allows the text editing application to open the text data file. In other words, when the controlled device 10 and the main controlling device 20 are not successfully paired, the email application may not be executed, the email login webpage may not be browsed, or the text data file may not be opened. Thereby, the controlled device 10 is provided with greater security.

In the other embodiment, when the controlled device 10 and the main controlling device 20 are successfully paired, the processing module 12 further determines whether signal strength for communicating with the main controlling device 20 is greater than a predetermined threshold value for a predetermined time period. When the signal strength for communicating with the main controlling device 20 is greater than the predetermined threshold value for the predetermined time period, the controlled device 10 executes the security mode. Otherwise, the controlled device 10 maintains the original state.

Figure 3:
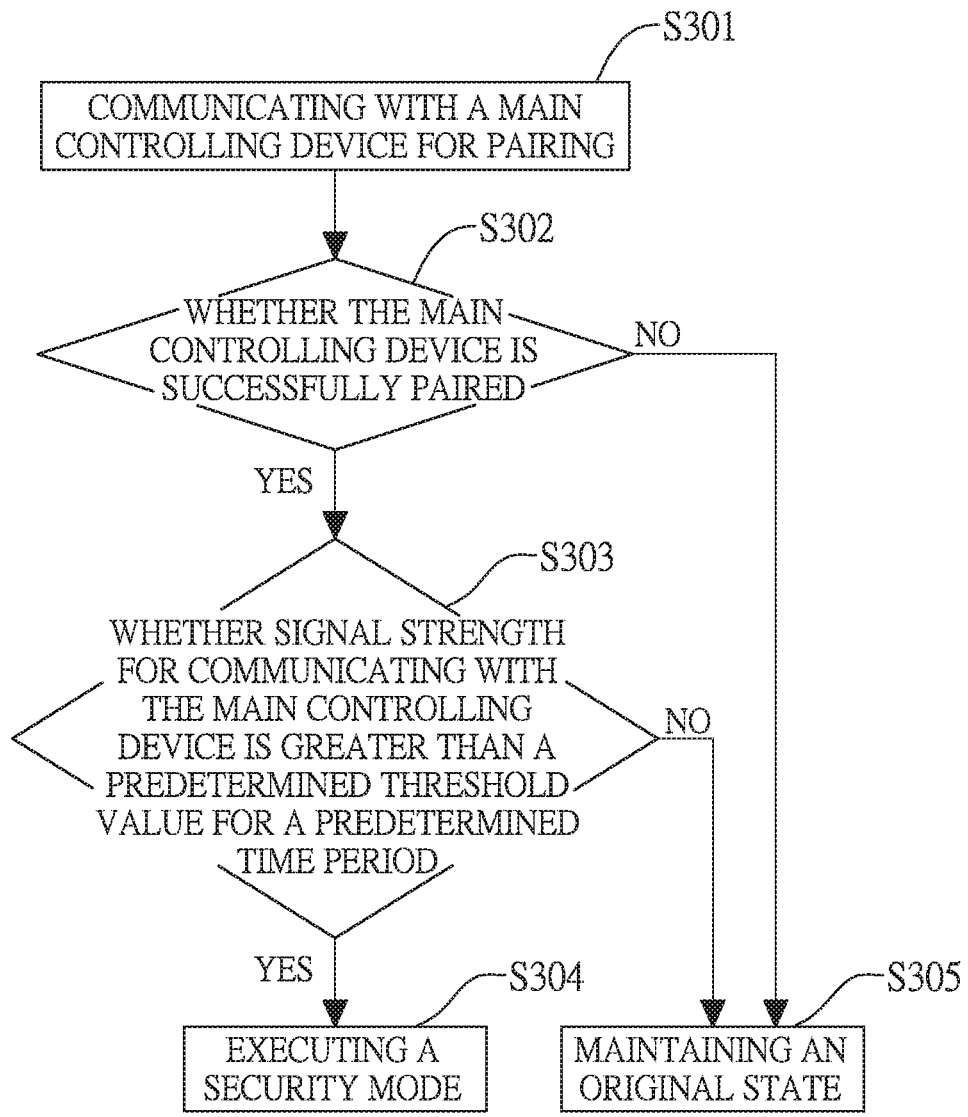
FIG. 3 is a flowchart of a second embodiment of a security management method of the present invention.

With reference to FIG. 3, a second embodiment of the security management method includes steps of:

communicating with a main controlling device 20 for pairing (S301);

determining whether the main controlling device 20 is successfully paired to the controlled device 10 (S302);

when the main controlling device 20 is successfully paired to the controlled device 10, determining whether signal strength for communicating with the main controlling device 20 is greater than a predetermined threshold value for a predetermined time period (S303);

when the signal strength for communicating with the main controlling device 20 is greater than the predetermined threshold value for the predetermined time period, executing a security mode (S304);

when the signal strength for communicating with the main controlling device 20 is not greater than the predetermined threshold value for the predetermined time period, maintaining an original state (S305).

With reference to FIG. 1, in one embodiment, the main controlling device 20 detects signal strength for communicating with the controlled device 10, and the main controlling device 20 further determines a duration of time during which the signal strength for communicating with the controlled device 10 is greater than the predetermined threshold value. The main controlling device 20 transmits information of the duration to the controlled device 10. The controlled device 10 receives the information of the duration from the main controlling device 20 to determine whether the duration is longer than the predetermined time period.

When the duration is longer than the predetermined time period, the controlled device 10 determines that the signal strength for communicating with the main controlling device 20 is greater than the predetermined threshold value for the predetermined time period. When the duration is not longer than the predetermined time period, the controlled device 10 determines that the signal strength for communicating with the main controlling device 20 is not greater than the predetermined threshold value for the predetermined time period.

In another embodiment, the main controlling device 20 detects the signal strength for communicating with the controlled device 10, and transmits the signal strength for communicating with the controlled device 10 to the controlled device 10. The processing module 12 receives the signal strength for communicating with the controlled device 10 through the wireless module 11. The processing module 12 further determines the duration of time during which the signal strength for communicating with the controlled device 10 is greater than the predetermined threshold value, and the controlled device 10 determines whether the duration is longer than the predetermined time period.

When the duration is longer than the predetermined time period, the processing module 12 determines that the signal strength for communicating with the main controlling device 20 is greater than the predetermined threshold value for the predetermined time period. Otherwise, when the duration is not longer than the predetermined time period, the controlled device 10 determines that the signal strength for communicating with the main controlling device 20 is not greater than the predetermined threshold value for the predetermined time period.

Further, before the controlled device 10 communicates with the main controlling device 20 for pairing, the processing module 12 determines whether a key device 30 is electrically connected to the controlled device 10. When the key device 30 is electrically connected to the controlled device 10, the processing module 12 directly executes the security mode. When the key device 30 is not electrically connected to the controlled device 10, the controlled device 10 communicates with the main controlling device 20 for pairing.

Thereby, two ways are provided for the user to allow the processing module 12 to execute the security mode. Hence, the present invention provides a more flexible security management method. In the embodiment, the controlled device 10 may be, but is not limited to, a desktop computer, a notebook computer, an electronic device such as a smart phone or a programmable machine. The processing module 12 may be, but is not limited to, a processor. The main controlling device 20 may be a portable electronic device such as, but not limited to, a computer, a smart phone, a sports bracelet, a wireless mouse, a wireless keyboard or a player. The key device 30 may be a flash drive, an etoken, or the like, but it is not limited thereto. The wireless module 11 is preferably, but not limited to, a Bluetooth module.

Figure 4:
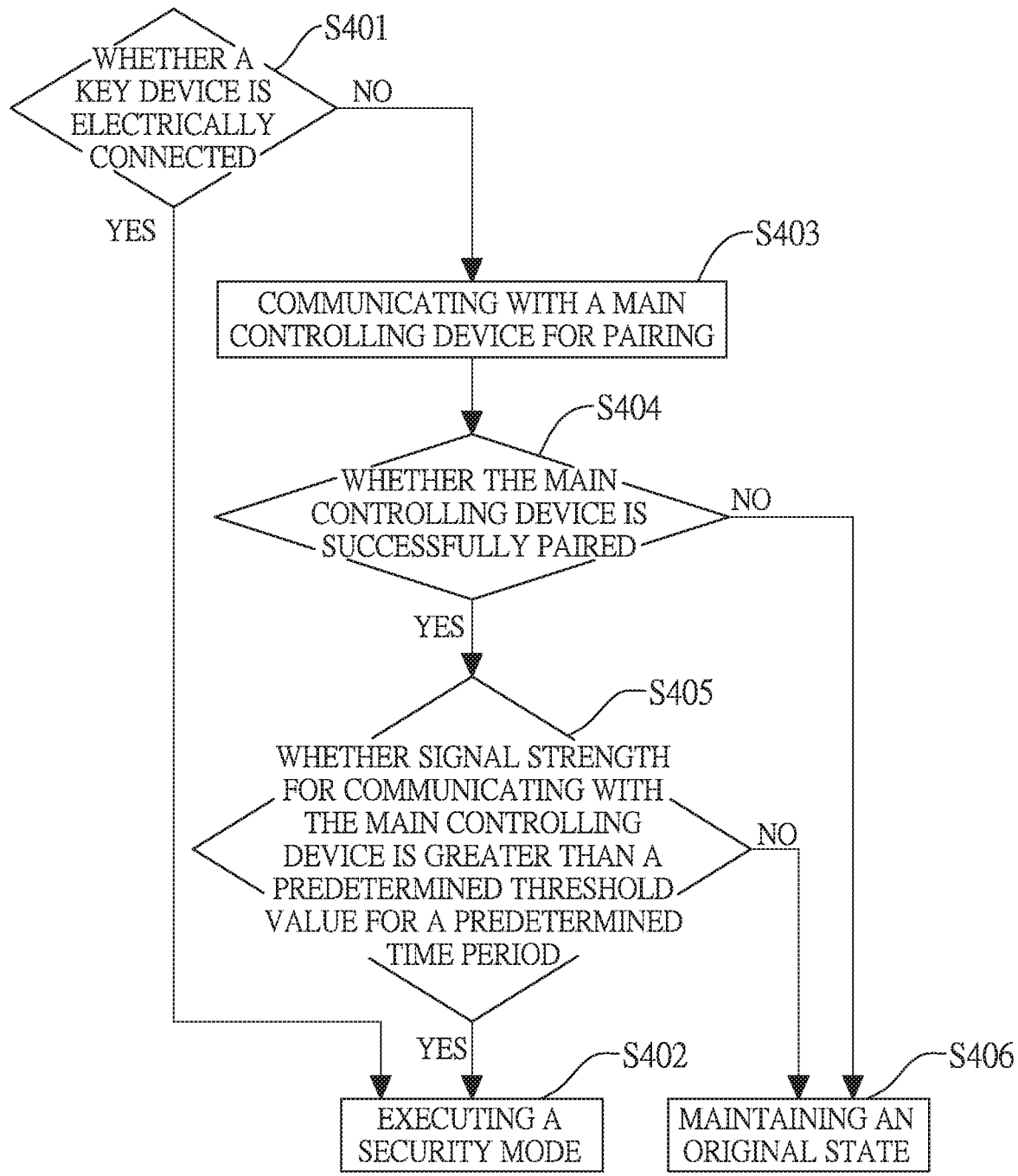
FIG. 4 is a flowchart of a third embodiment of a security management method of the present invention.

With reference to FIG. 4, a third embodiment of the security management method includes steps of:

determining whether a key device 30 is electrically connected (S401);

when the key device 30 is electrically connected, executing a security mode (S402);

when the key device 30 is not electrically connected, communicating with the main controlling device 20 for pairing (S403);

determining whether the main controlling device 20 is successfully paired to the controlled device 10 (S404);

when the main controlling device 20 is successfully paired to the controlled device 10, determining whether signal strength for communicating with the main controlling device 20 is greater than a predetermined threshold value for a predetermined time period (S405);

when the signal strength for communicating with the main controlling device 20 is greater than the predetermined threshold value for the predetermined time period, executing the security mode (S402);

when the signal strength for communicating with the main controlling device 20 is not greater than the predetermined threshold value for the predetermined time period, or when the main controlling device 20 is not successfully paired to the controlled device 10, maintaining an original state (S406).

Figure 5:
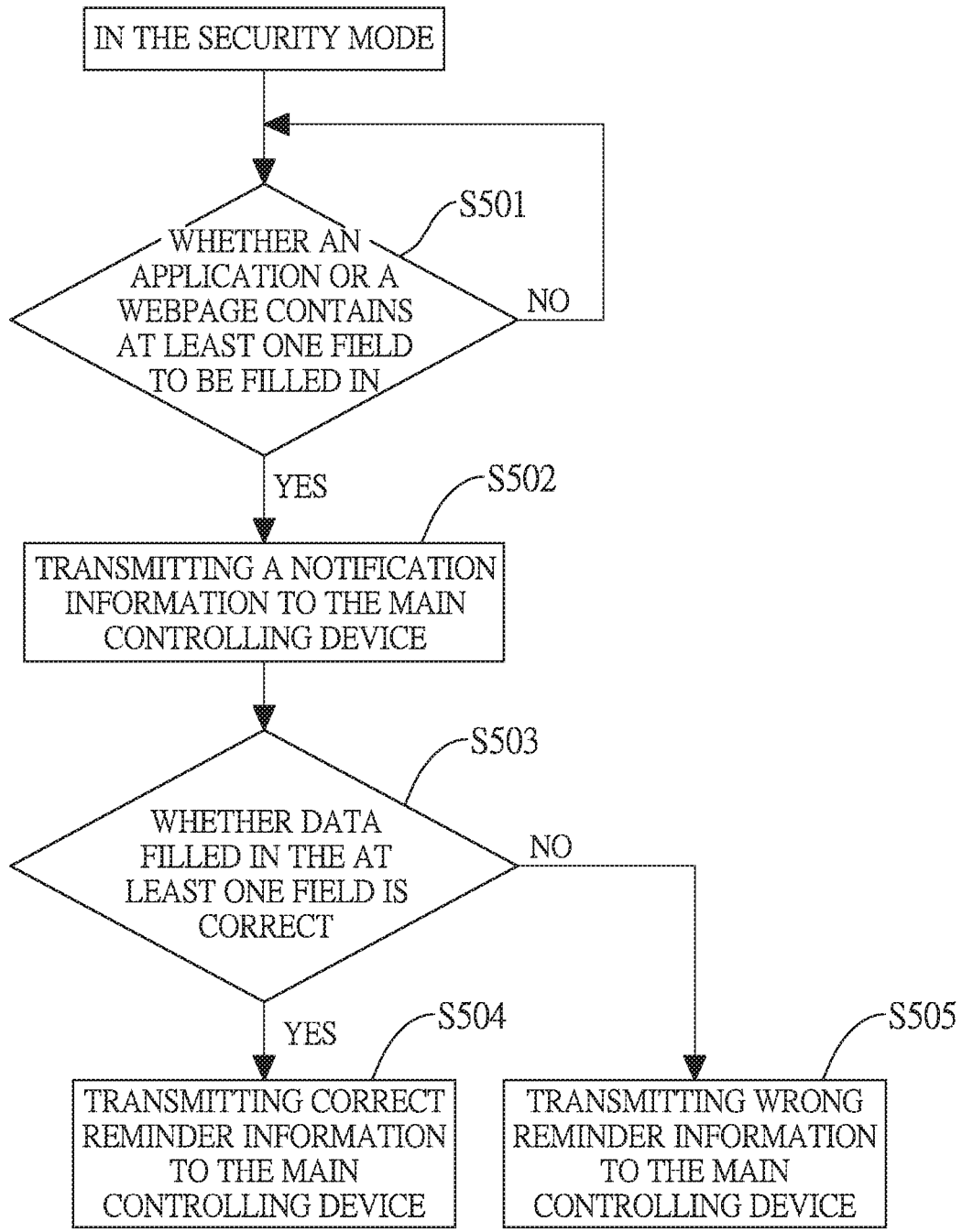
FIG. 5 is a flowchart of an embodiment of a security management procedure of a security management method of the present invention.

Further, with reference to FIG. 5, when the processing module 12 executes the security mode, the processing module 12 executes a security management procedure. The security management procedure includes steps of:

determining whether an application or a webpage contains at least one field to be filled in (S501);

when the application or the webpage contains the at least one field to be filled in, transmitting a notification information to the main controlling device 20 (S502).

In the embodiment, the application may be an operation system of a computer or a smartphone or a program installed in the computer or the smartphone.

When the controlled device 10 determines that the application or the webpage contains the at least one field to be filled in, the controlled device 10 may transmit the notification information to the main controlling device 20 to remind the user that the application or the webpage executed by the main controlling device 20 contains the at least one field to be filled in. Then, the user may directly determine whether the controlled device 10 is operated by an authorized user. Therefore, the controlled device 10 may not be operated by an unauthorized user, and the personal privacy-sensitive information of the user stored in the controlled device 10 may be protected.

For example, the controlled device 10 may be a computer. In the security mode, the controlled device 10 logs out the operation system of the controlled device 10, and is in a locked state. In the locked state, there are fields to be filled in, and the fields may be filled in with the account information and the password. The controlled device 10 may transmit the notification information to the main controlling device 20 to remind the user that a current state of the main controlling device 20 contains at least one field to be filled in. Therefore, the user may be informed as early as possible that the controlled device 10 may be logged in soon by others. The user may directly confirm an identity of a person who is using the controlled device 10, and the personal privacy-sensitive information of the user stored in the controlled device 10 may be prevented from being accessed and stolen.

The security management procedure further includes steps of:

determining whether data filled in the at least one field is correct (S503);

when the data filled in the at least one field is correct, transmitting correct reminder information to the main controlling device 20 (S504);

when the data filled in the at least one field is incorrect, transmitting wrong reminder information to the main controlling device 20 (S505).

Namely, after the at least one field is filled in, the security management procedure may further determine whether the data filled in the at least one field is correct. When the data filled in the at least one field is correct, the controlled device 10 transmits the correct reminder information to the main controlling device 20 to notify the user. Therefore, the user may determine that the person who is using the controlled device 10 can load any information stored in the controlled device 10. The user may directly confirm the identity of the person who is using the controlled device 10, and the personal privacy-sensitive information of the user stored in the controlled device 10 may be prevented from being accessed and stolen.

When the data filled in the at least one field is incorrect, the controlled device 10 may transmit the wrong reminder information to the main controlling device 20 to notify the user. Therefore, the user may determine that the person who is using the controlled device 10 inputs wrong data, and the user may directly confirm whether the controlled device 10 is used by an unauthorized person.

In the embodiment, the at least one field to be filled in may be a biometric identification data field for the user to input biological identification information such as fingerprint or facial recognition. When the user inputs the biometric identification information, the controlled device 10 transmits the correct reminder information or the wrong reminder information to the main controlling device 20 according to the recognition result. Therefore, the user may know that someone is currently trying to log in to the controlled device 10, so that the user can directly determine an identity of the one who is currently using the controlled device 10.

Figure 6:
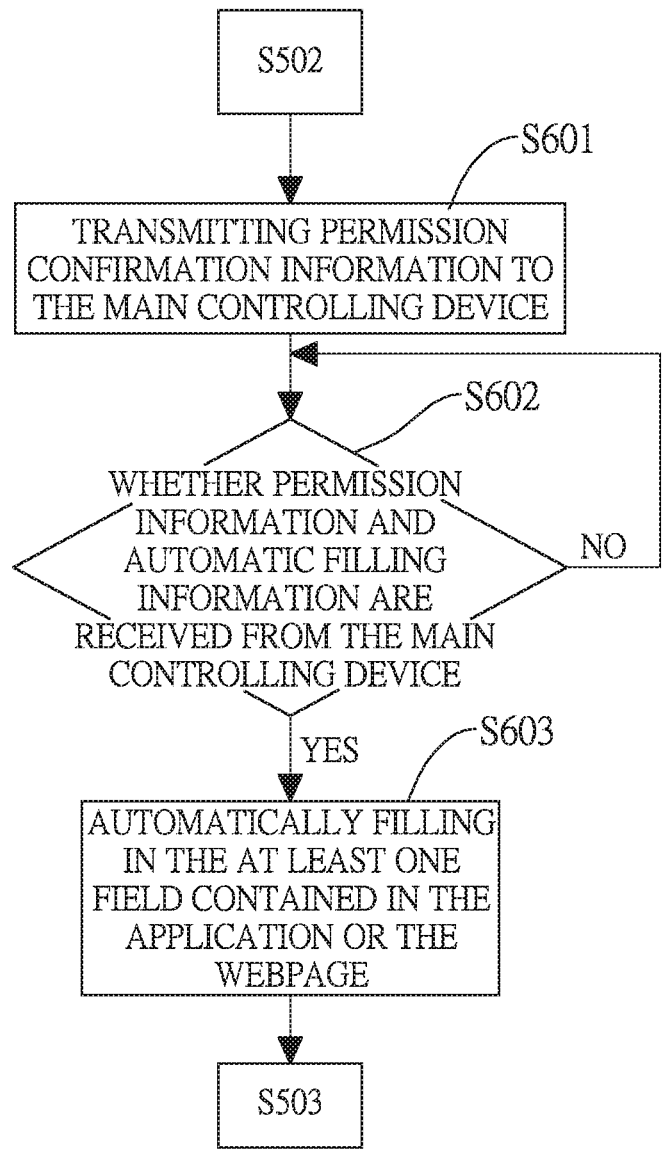
FIG. 6 is another flowchart of a security management procedure of a security management method of the present invention.

With reference to FIG. 6, after the step S502, the security management procedure further includes steps of:

transmitting permission confirmation information to the main controlling device 20 (S601);

determining whether permission information and automatic filling information are received from the main controlling device 20 (S602);

when the permission information and the automatic filling information are received from the main controlling device 20, automatically filling in the at least one field contained in the application or the webpage (S603), and executing the step S503.

In this way, when the controlled device 10 determines that the application or the webpage contains the at least one field, the controlled device 10 not only transmits the notification information to the main controlling device 20, but also transmits the permission confirmation information to the main controlling device 20. When the controlled device 10 receives the permission information and the automatic filling information returned by the main controlling device 20, the controlled device 10 can automatically fill in the at least one field contained in the application or the webpage according to the automatic filling information. Namely, the controlled device 10 can receive the automatic filling information transmitted from the main controlling device 20 to automatically fill data in the at least one field.

Since the automatic filling information is transmitted by the main controlling device 20, the user does not need to manually input the data in the at least one field and may store the data in the main controlling device 20. When the main controlling device 20 is nearby the controlled device 10, the controlled device 10 may execute the security management procedure to automatically fill the data in the at least one field. Therefore, the user does not need to memorize the data to be input. Further, since the main controlling device 20 is held by the user, the confidentiality of the data to be input may be protected by the user.

In the embodiment, the data to be filled in the at least one field which the controlled device 10 can automatically input may be a name, phone number, address, etc. of a purchaser to be filled in a checkout webpage of a shopping website, or may be a credit card number, depending on usage.

In another embodiment, when the controlled device 10 executes a predetermined program to open an encrypted data file, the controlled device 10 may automatically input the password to decrypt the encrypted data file.

For example, when the user wants to open an encrypted text file, the user may use the controlled device 10 to execute a text editing program to open the encrypted text file. When the text editing program opens the encrypted text file, it is required to input a password at first to decrypt the encrypted text file. In this case, when the controlled device 10 is successfully paired to the main controlling device 20 to execute the security mode, the controlled device 10 may automatically input the password. Therefore, the user need not manually input the password, and the password may be automatically inputted to open the encrypted text file.

Figure 7:
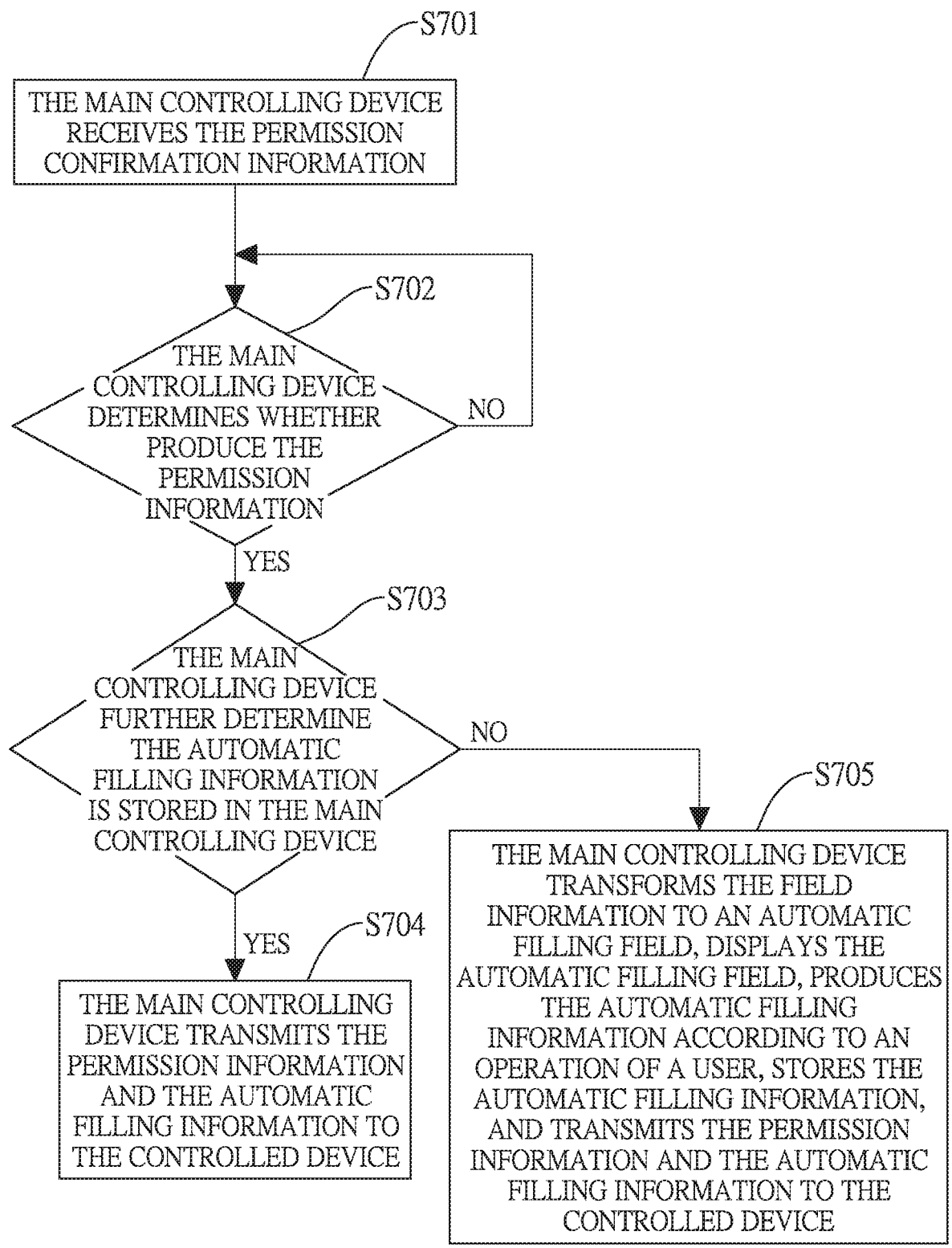
FIG. 7 is still another flowchart of a security management procedure of a security management method of the present invention.

With reference to FIG. 7, when the main controlling device 20 receives the permission confirmation information (S701), the main controlling device 20 determines whether to produce the permission information (S702). When the main controlling device 20 produces the permission information, the main controlling device 20 further determines the automatic filling information is stored in the main controlling device 20 (S703). When the main controlling device 20 determines that the main controlling device 20 stores the automatic filling information, the main controlling device 20 transmits the permission information and the automatic filling information to the controlled device 10 (S704). The permission confirmation information transmitted by the controlled device 10 includes field information. When the main controlling device 20 determines that the main controlling device 20 does not store the automatic filling information, the main controlling device 20 transforms the field information to an automatic filling field, and the main controlling device 20 displays the automatic filling field. The main controlling device 20 further produces the automatic filling information according to an operation of a user. The main controlling device 20 stores the automatic filling information, and the main controlling device 20 transmits the permission information and the automatic filling information to the controlled device 10 (S705).

For example, when the controlled device 10 executes an operating system, the operating system may enter the locked state first and provide an account information field and a password field to be filled in by the user. At this time, the controlled device 10 transmits the reminder information to the main controlling device 20 to remind the user of the main controlling device 20 that the controlled device 10 is being used. And the controlled device 10 transmits the permitting confirmation information to the main controlling device 20.

When the user of the main controlling device 20 confirms that the person who is using the controlled device 10 is authorized, the user can operate the main controlling device 20 to generate the permission information. The main controlling device 20 further determines whether the automatic filling information is stored in the main controlling device 20. When the main controlling device 20 stores the automatic filling information, the main controlling device 20 transmits the permission information and the automatic filling information to the controlled device 10. The controlled device 10 may automatically input the data in the at least one field of the application or the webpage.

However, when the automatic filling information is not stored in the main controlling device 20, the main controlling device 20 generates the automatic filling field according to the field information, and the main controlling device 20 produces the automatic filling information according to the operation of a user. The main controlling device 20 stores the automatic filling information, and transmits the permission information and the automatic filling information to the controlled device 10. Therefore, the user only needs to operate the main controlling device 20, and the controlled device 10 may automatically input data. Further, the automatic filling information can be stored in the main controlling device 20. When the user opens the application or the webpage again, the user may not need to input the data again. The user only needs to operate the main controlling device 20 to generate the permission information, and the data may be automatically inputted in the at least one field. The controlled device 10 and the main controlling device 20 provide a convenient environment for the user.

When the main controlling device 20 automatically inputs the automatic filling information in the at least one field of the application program or the webpage, the controlled device 10 wirelessly receives the automatic filling information from the main controlling device 20. Namely, the controlled device 10 does not store the automatic filling information. Since the automatic filling information is not stored in the controlled device 10 but stored in the main controlling device 20, and the main controlling device 20 is less likely to be lost, the automatic filling information has a higher security.

Figure 8:
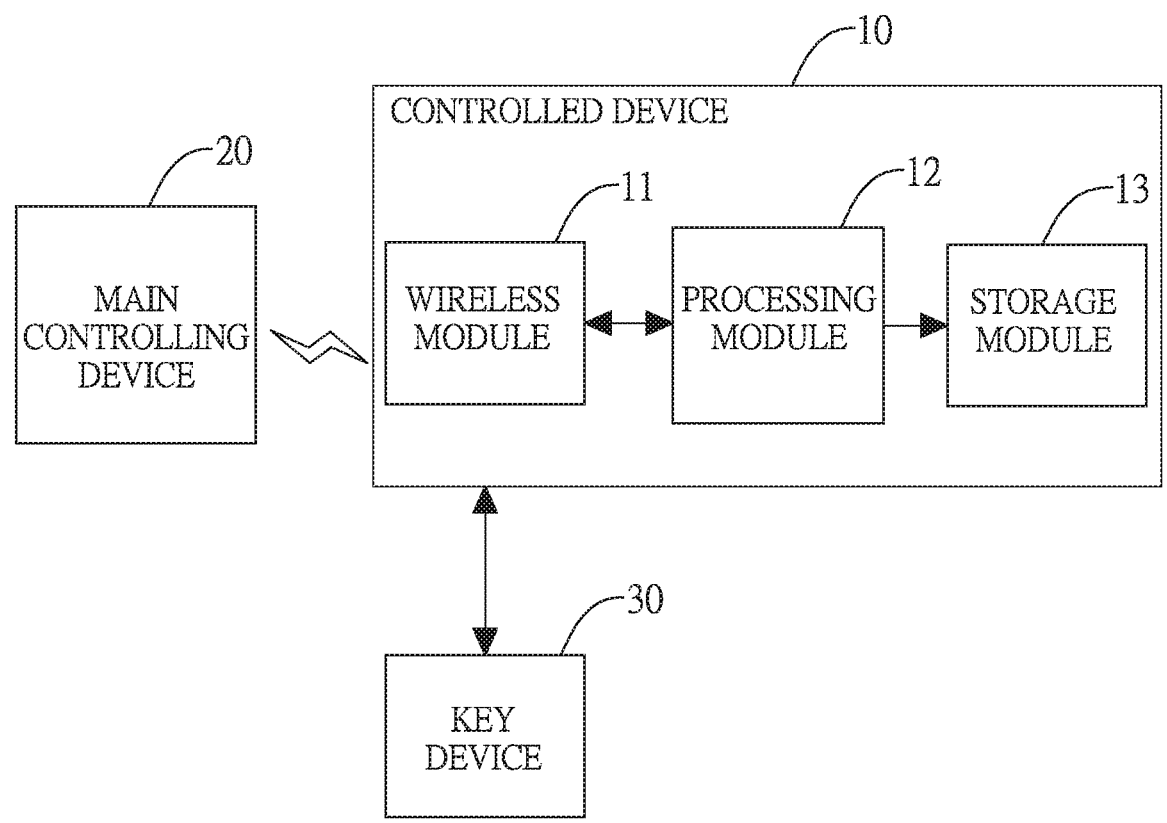
FIG. 8 is another block diagram of a security management system of the present invention.

With reference to FIG. 8, the controlled device 10 further includes a storage module 13. The storage module 13 stores the above-mentioned automatic filling information. The automatic filling information is data that the processing module 12 automatically inputs in the at least one field of the application or the webpage.

After the controlled device 10 executes the security management procedure to transmit the notification information to the main controlling device 20, the controlled device 10 further transmits the permission confirmation information to the main controlling device 20. The controlled device 10 determines whether the permission information transmitted by the main controlling device 20 is received. When the controlled device 10 determines that the permission information is received, the controlled device 10 fills in the at least one field of the application or the webpage according to the automatic filling information stored in the storage module 13.

Therefore, since the controlled device 10 and the main controlling device 20 are successfully paired, the user may hold the main controlling device 20 nearby the controlled device 10, and the user may directly use the controlled device 10, or the user may know who is using the controlled device 10. Then, the processing module 12 may execute the security mode. Therefore, when the at least one field of the application or the webpage needs to be filled in, the processing module 12 may directly input the automatic filling information in the at least one field according to the automatic filling information stored in the storage module 13. The user may conveniently use the controlled device 10.

For example, the main controlling device 20 can be a wristband worn on the user. Therefore, when the user is using the controlled device 10 or nearby the controlled device 10, the controlled device 10 can communicate with and can be paired to the main controlling device 20, and the controlled device 10 may execute the security mode. When the application or the webpage includes the at least one field, the controlled device 10 can directly read the automatic filling information stored in the storage module 13, and the controlled device 10 may automatically input the automatic filling information in the at least one field.

In addition, in a further embodiment, the main controlling device 20 is connected to the controlled device 10, and the main controlling device 20 determines whether an application opening instruction is generated. When the main controlling device 20 determines that the application opening instruction is generated, the main controlling device 20 transmits an application executing instruction and the automatic filling information to the controlled device 10.

When the controlled device 10 receives the application executing instruction and the automatic filling information, the controlled device 10 executes a predetermined application, and inputs data in the at least one field of the predetermined application according to the automatic filling information.

Namely, in the embodiment, the user can operate the main controlling device 20 to generate the application executing instruction, and the controlled device 10 may directly execute the predetermined application, and automatically input data according to the automatic filling information in the at least one field of the predetermined application.

The user of the main controlling device 20 can directly open the predetermined application in the controlled device 10 by operating the main controlling device 20, and the main controlling device 20 can transmit the automatic filling information to the controlled device 10. Therefore, the controlled device 10 may automatically fill the data in the at least one field of the predetermined application, and the user may conveniently operate the controlled device 10.

For example, the user can generate the application opening instruction by operating the mobile phone, as the main controlling device 20, to allow the computer, as the controlled device 10, to execute the predetermined application. At the same time, the mobile device further transmits the automatic filling information to the computer to allow the computer to automatically input the data in the at least one field of the predetermined application according to the automatic filling information. Therefore, the user can directly execute the predetermined application through the computer without inputting data, and the user may conveniently use the controlled device 10.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A security management method, executed by a controlled device, and the security management method comprising steps of:
   communicating with a main controlling device for pairing;
   determining whether the main controlling device is successfully paired to the controlled device; and
   when the main controlling device is successfully paired to the controlled device, executing a security mode;
   wherein
      when the main controlling device is successfully paired to the controlled device, the controlled device further determines whether signal strength for communicating with the main controlling device is greater than a predetermined threshold value for a predetermined time period; and
      when the signal strength for communicating with the main controlling device is greater than the predetermined threshold value for the predetermined time period, the controlled device executes the security mode; and
   wherein
      the main controlling device detects signal strength for communicating with the controlled device, the main controlling device determines a duration of time during which the signal strength for communicating with the controlled device is greater than the predetermined threshold value, and the main controlling device transmits information of the duration to the controlled device;
      the controlled device receives the information of the duration to determine whether the duration is longer than the predetermined time period;
      when the duration is longer than the predetermined time period, the controlled device determines that the signal strength for communicating with the main controlling device is greater than the predetermined threshold value for the predetermined time period; and
      when the duration is not longer than the predetermined time period, the controlled device determines that the signal strength for communicating with the main controlling device is not greater than the predetermined threshold value for the predetermined time period.

2. A security management method, executed by a controlled device, and the security management method comprising steps of:
   communicating with a main controlling device for pairing;
   determining whether the main controlling device is successfully paired to the controlled device; and
   when the main controlling device is successfully paired to the controlled device, executing a security mode;
   wherein
      when the main controlling device is successfully paired to the controlled device, the controlled device further determines whether signal strength for communicating with the main controlling device is greater than a predetermined threshold value for a predetermined time period; and
      when the signal strength for communicating with the main controlling device is greater than the predetermined threshold value for the predetermined time period, the controlled device executes the security mode; and
   wherein
      the main controlling device detects signal strength for communicating with the controlled device, and transmits the signal strength for communicating with the controlled device to the controlled device;
      the controlled device receives the signal strength for communicating with the controlled device, determines a duration of time during which the signal strength for communicating with the controlled device is greater than the predetermined threshold value, and determines whether the duration is longer than the predetermined time period;
      when the duration is longer than the predetermined time period, the controlled device determines that the signal strength for communicating with the main controlling device is greater than the predetermined threshold value for the predetermined time period; and
      when the duration is not longer than the predetermined time period, the controlled device determines that the signal strength for communicating with the main controlling device is not greater than the predetermined threshold value for the predetermined time period.

3. The security management method as claimed in claim 2, wherein when the security mode is executed, a security management procedure is executed, and the security management procedure comprises steps of:
   determining whether an application or a webpage contains at least one field to be filled in; and
   when the application or the webpage contains the at least one field to be filled in, transmitting a notification information to the main controlling device.

4. The security management method as claimed in claim 3, wherein the security management procedure further comprises steps of:
   determining whether data filled in the at least one field is correct;
   when the data filled in the at least one field is correct, transmitting correct reminder information to the main controlling device; and
   when the data filled in the at least one field is incorrect, transmitting wrong reminder information to the main controlling device.

5. A controlled device, communicating with a main controlling device for pairing,
   wherein when the controlled device is successfully paired to the main controlling device, the controlled device executes a security mode;
   wherein:
      when the main controlling device is successfully paired to the controlled device, the controlled device further determines whether signal strength for communicating with the main controlling device is greater than a predetermined threshold value for a predetermined time period;
      when the signal strength for communicating with the main controlling device is greater than the predetermined threshold value for the predetermined time period, the controlled device executes the security mode; and
   wherein
      the main controlling device detects signal strength for communicating with the controlled device, the main controlling device determines a duration of time during which the signal strength for communicating with the controlled device is greater than the predetermined threshold value, and the main controlling device transmits information of the duration to the controlled device;

the controlled device receives the information of the duration to determine whether the duration is longer than the predetermined time period;

when the duration is longer than the predetermined time period, the controlled device determines that the signal strength for communicating with the main controlling device is greater than the predetermined threshold value for the predetermined time period; and when the duration is not longer than the predetermined time period, the controlled device determines that the signal strength for communicating with the main controlling device is not greater than the predetermined threshold value for the predetermined time period.

6. A controlled device, communicating with a main controlling device for pairing;

wherein when the controlled device is successfully paired to the main controlling device, the controlled device executes a security mode, and wherein the main controlling device detects signal strength for communicating with the controlled device, and transmits the signal strength for communicating with the controlled device to the controlled device;

the controlled device receives the signal strength for communicating with the controlled device, determines a duration of time during which the signal strength for communicating with the controlled device is greater than a predetermined threshold value, and determines whether the duration is longer than a predetermined time period;

when the duration is longer than the predetermined time period, the controlled device determines that the signal strength for communicating with the main controlling device is greater than the predetermined threshold value for the predetermined time period; and when the duration is not longer than the predetermined time period, the controlled device determines that the signal strength for communicating with the main controlling device is not greater than the predetermined threshold value for the predetermined time period.

7. A security management system, comprising:

a main controlling device; and a controlled device, communicating with the main controlling device for pairing;

wherein when the controlled device is successfully paired to the main controlling device, the controlled device executes a security model;

wherein:

when the main controlling device is successfully paired to the controlled device, the controlled device further determines whether signal strength for communicating with the main controlling device is greater than a predetermined threshold value for a predetermined time period; and when the signal strength for communicating with the main controlling device is greater than the predetermined threshold value for the predetermined time period, the controlled device executes the security mode; and wherein the main controlling device detects signal strength for communicating with the controlled device, the main controlling device determines a duration of time during which the signal strength for communicating with the controlled device is greater than the predetermined threshold value, and the main controlling device transmits information of the duration to the controlled device;

the controlled device receives the information of the duration to determine whether the duration is longer than the predetermined time period;

when the duration is longer than the predetermined time period, the controlled device determines that the signal strength for communicating with the main controlling device is greater than the predetermined threshold value for the predetermined time period; and when the duration is not longer than the predetermined time period, the controlled device determines that the signal strength for communicating with the main controlling device is not greater than the predetermined threshold value for the predetermined time period.

8. A security management system, comprising:

a main controlling device; and a controlled device, communicating with the main controlling device for pairing;

wherein when the controlled device is successfully paired to the main controlling device, the controlled device executes a security model;

wherein:

when the main controlling device is successfully paired to the controlled device, the controlled device further determines whether signal strength for communicating with the main controlling device is greater than a predetermined threshold value for a predetermined time period; and when the signal strength for communicating with the main controlling device is greater than the predetermined threshold value for the predetermined time period, the controlled device executes the security mode; and wherein the main controlling device detects signal strength for communicating with the controlled device, and transmits the signal strength for communicating with the controlled device to the controlled device;

the controlled device receives the signal strength for communicating with the controlled device, determines a duration of time during which the signal strength for communicating with the controlled device is greater than the predetermined threshold value, and determines whether the duration is longer than the predetermined time period;

when the duration is longer than the predetermined time period, the controlled device determines that the signal strength for communicating with the main controlling device is greater than the predetermined threshold value for the predetermined time period; and when the duration is not longer than the predetermined time period, the controlled device determines that the signal strength for communicating with the main controlling device is not greater than the predetermined threshold value for the predetermined time period.

9. The security management system as claimed in claim 8, further comprising:

a key device; wherein the controlled device determines whether the key device is electrically connected before the controlled device communicates with the main controlling device for pairing;

when the key device is electrically connected, the controlled device directly executes the security mode; and when the key device is not electrically connected, the controlled device communicates with the main controlling device for pairing.

10. The security management system as claimed in claim 8, wherein when the security mode is executed, a predetermined application is allowed to be executed, a predetermined web browser is allowed to browse a predetermined webpage, or a predetermined application is allowed to execute a predetermined data file.

11. The security management system as claimed in claim 8, wherein when the security mode is executed, a security management procedure is executed by the controlled device, and the security management procedure comprises steps of:

determining whether an application or a webpage contains at least one field to be filled in;

when the application or the webpage contains the at least one field to be filled in, transmitting a notification information to the main controlling device.

12. A security management system, comprising:

a main controlling device; and a controlled device, communicating with the main controlling device for pairing;

wherein when the controlled device is successfully paired to the main controlling device, the controlled device executes a security mode; and wherein when the main controlling device receives permission confirmation information from the controlled device, the main controlling device determines whether to produce permission information;

when the main controlling device produces the permission information, the main controlling device further determines automatic filling information is stored in the main controlling device;

when the main controlling device determines that the main controlling device stores the automatic filling information, the main controlling device transmits the permission information and the automatic filling information to the controlled device.

13. The security management system as claimed in claim 12, wherein the permission confirmation information transmitted by the controlled device comprises field information;

when the main controlling device determines that the main controlling device does not store the automatic filling information, the main controlling device transforms the field information to an automatic filling field, and the main controlling device displays the automatic filling field;

the main controlling device further produces the automatic filling information according to an operation of a user;

the main controlling device stores the automatic filling information, and the main controlling device transmits the permission information and the automatic filling information to the controlled device.

14. The security management system as claimed in claim 12, wherein:

the main controlling device determines whether an application opening instruction is generated;

when the main controlling device determines that the application opening instruction is generated, the main controlling device transmits an application executing instruction and the automatic filling information to the controlled device;

when the controlled device receives the application executing instruction and the automatic filling information, the controlled device executes a predetermined application, and inputs data in at least one field of the predetermined application according to the automatic filling information.

* * * * *